May 9, 1961  R. SILBERBACH ET AL  2,983,868
ELECTRONIC TACHOMETER
Filed Aug. 20, 1957  2 Sheets-Sheet 1
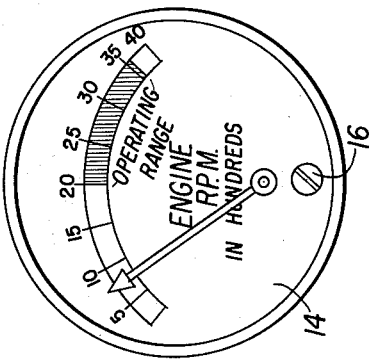
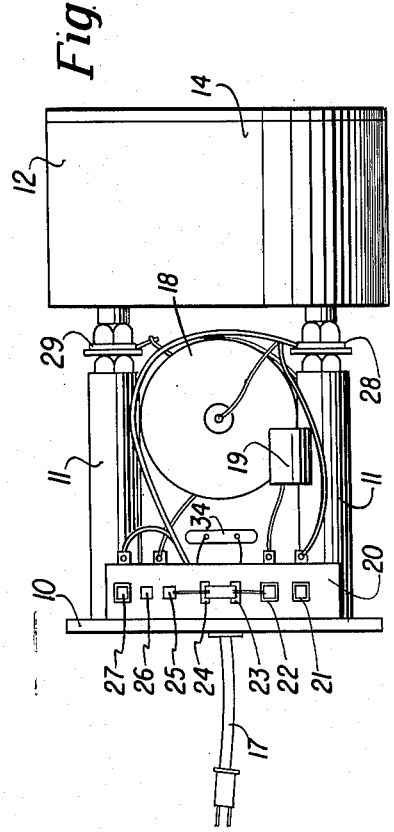
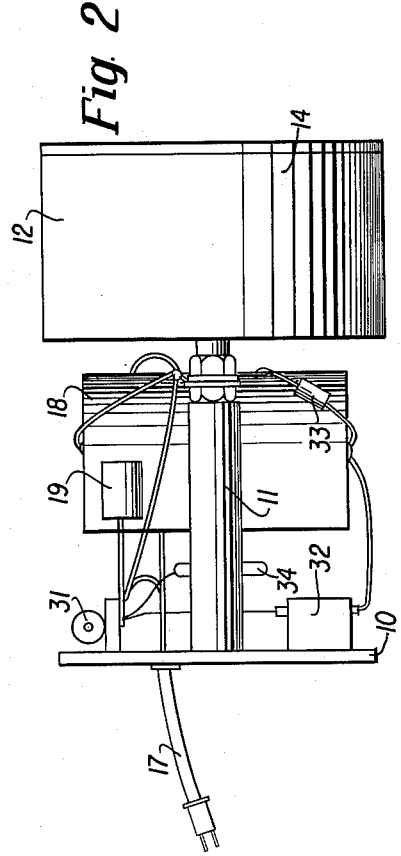
INVENTORS
Richard Silberbach
BY  Peter Kapteyn
Mueller & Aichele
Attys.

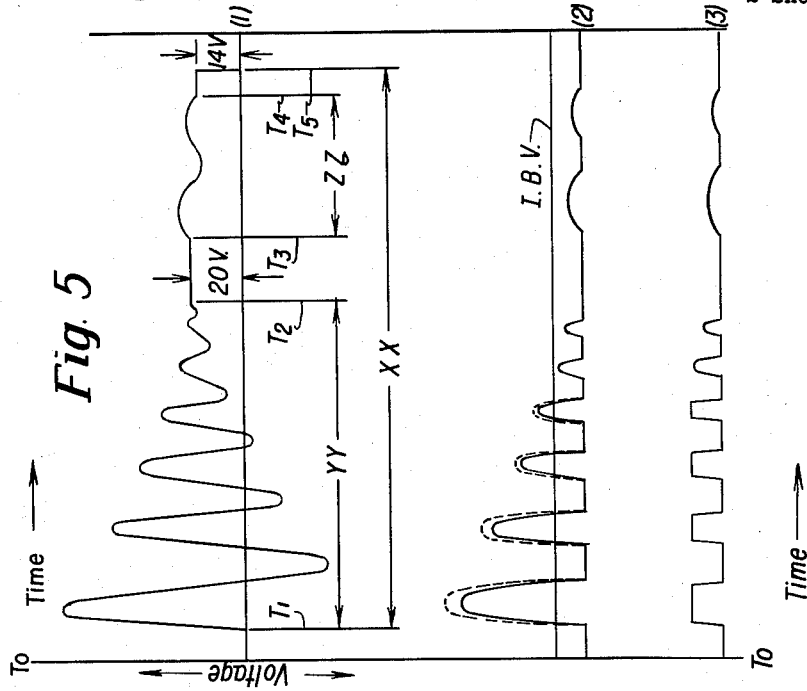
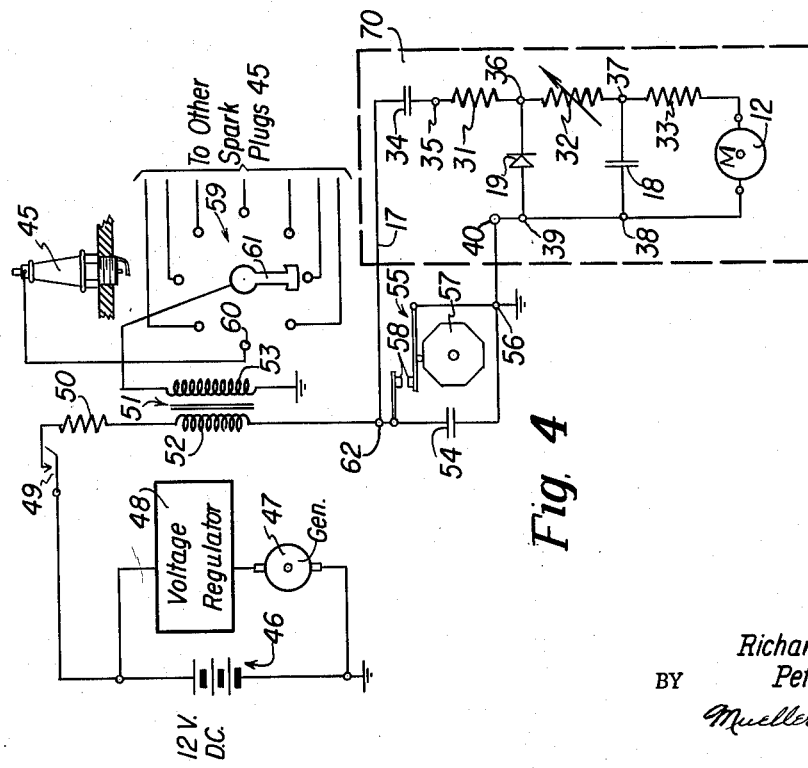

United States Patent Office 2,983,868
Patented May 9, 1961

1

2,983,868
ELECTRONIC TACHOMETER
Richard Silberbach and Peter Kapteyn, Chicago, Ill., assignors to Motorola, Inc., Chicago, Ill., a corporation of Illinois
Filed Aug. 20, 1957, Ser. No. 679,303
3 Claims. (Cl. 324—70)

This invention relates to electronic frequency measuring apparatus, and more particularly to a tachometer for indicating the speed of an internal combustion engine having a spark ignition system.

Various types of tachometers have been proposed for use with vehicles having an internal combustion engine. These tachometers have frequently relied upon mechanical elements which wear after a period of use and then do not perform satisfactorily. Completely electronic tachometers have been provided to overcome this difficulty, but they have generally been too expensive for use with mass produced vehicles such as automobiles and trucks, and frequently they have not been of desirable accuracy. While accuracy has been obtained in some instruments, an objectionably high cost has usually accompanied it.

Accordingly, it is an object of this invention to provide an electronic tachometer which may be manufactured at a relatively low cost, and which will be sufficiently accurate for use in mass produced vehicles.

A more particular object of the invention is to provide an electronic tachometer operated by the electrical pulses generated by the spark ignition system of a vehicle in which the calibration will not be impaired by variations in the voltage level of the pulses.

Another object of the invention is to provide an electronic tachometer for indicating the engine speed of a spark ignited internal combustion engine, which tachometer will not adversely affect the operation of the ignition system of the engine.

A feature of the invention is the provision of an electronic tachometer for counting the pulses generated by the spark ignition system of an internal combustion engine having an improved circuit for rectifying and limiting the oscillatory components of the pulses which result from shock excitation of the inductance and capacitance elements of the ignition system.

A further feature of the invention is the provision of an electronic tachometer operated by electrical pulses which include oscillatory signals, and having a diode with a fixed inverse breakdown voltage for limiting and clipping the oscillatory signals of the pulses to provide accurate readings.

A still further feature of the invention is the provision of an improved electronic tachometer adapted to be coupled across the breaker points of a spark ignition system, and including a relatively high impedance input circuit for reducing the effect of the tachometer on the operation of the ignition system.

Referring to the drawings:

Fig. 1 is a plan view of the tachometer of the invention;

Fig. 2 is an elevational view of the tachometer of Fig. 1;

Fig. 3 is a view of the face of the meter forming a part of the tachometer of Fig. 1;

Fig. 4 is a circuit diagram in accordance with the invention showing the electrical system of the tachometer connected to the ignition system of an internal combustion engine; and Fig. 5 is a graph showing a series of curves which illustrate the operation of the system of Fig. 4.

In practicing the invention, there is provided a tachometer which is adapted to be coupled across the breaker points of the ignition system of a vehicle. The ignition system includes inductance and capacitance elements which are shock excited as the breaker points rapidly open and close. This shock excitation produces oscillatory signals which may be applied to the tachometer to operate it. The tachometer has a high impedance input circuit to insure that the functioning of the ignition system is not impaired. The signals are applied to a zener diode, and an ammeter measures the rectified and limited value of the signals. The ammeter is calibrated to read in revolutions per minute to provide an indication of the speed of the vehicle's engine.

Fig. 1 shows a tachometer in accordance with the invention supported by a mounting plate 10 and a pair of insulating rods 11 which are mounted on the meter terminals 28 and 29. Electrical pulses are applied to the tachometer through conductor 17 which is adapted to be connected to the ignition system of a vehicle. The wiring system of the tachometer is interconnected at the terminals 21—27 of terminal board 20 and meter terminals 28 and 29. The circuit elements include a capacitor 34 of a wafer-type, a zener diode 19, and resistors 31, 32 and 33. A capacitor 18 forms a part of a meter damping network which supplies a current to the meter 12. This current bears a substantially linear relationship to the frequency of the pulses applied to the tachometer so that the face of the meter shown in Fig. 3 may be calibrated in revolutions per minute. A screw 16, which is mounted on the face plate 14, may be adjusted to set the pointer of the meter 12 at the zero reading. The meter is calibrated to read the r.p.m. of an engine within a range of zero to 4,000, and the range within which the engine will operate most efficiently is designated the "operating range."

Fig. 4 shows the circuits of a system where the tachometer 70 is supplied with pulses produced by the ignition system of an eight cylinder automobile engine. The spark plugs 45, forming a part of the engine, are energized by power supplied by a battery 46 and supplemented by a generator 47 which is controlled by a voltage regulator 48. The ignition system includes an ignition switch 49 connected through a temperature compensating resistor 50 to one end of the primary winding 52 of the transformer 51. The other end of primary winding 52 is grounded at point 56 through capacitor 54 and circuit breaker 55 which are connected in parallel. The secondary winding 53 of transformer 51 is grounded at one end and connected to a conventional distributor 59 at the other end. One of the eight points 60 of the distributor is connected to the spark plug 45.

The contact arm 61 of distributor 59 is rotated in synchronism with cam 57, and upon reaching point 60, will complete an electrical connection between the secondary winding 53 and the spark plug 45. The cam 57 repeatedly opens and closes breaker points 58 as it rotates. When ignition switch 49 is closed and breaker points 58 are also closed, a low impedance path through primary winding 52 will be completed to ground, and a relatively high direct current will flow through the primary winding causing a magnetic field in the core of the transformer 51. When the breaker points 58 open, the shunt path bypassing the capacitor 54 is broken suddenly so that the primary winding 52 and the capacitor 54 connected in series across the opened breaker points are shock excited. The flux of the winding 52 begins collapsing and generates an oscillating voltage in the winding 52 which is maintained and damped by the primary winding 52 and the capacitor 54 in series. The collapsing flux also generates a high voltage in the secondary winding 53 which produces a spark in the spark plug 45 selected by the contact arm 61. The oscillating voltage produced in the primary winding is damped and maintained for a certain period of time depending on the total circuit Q of the resonance circuit, and this voltage is stepped up through the transformer 51 which has a large winding ratio, and acts to maintain the spark for a corresponding period of time. The spark, of course, ignites the fuel injected into the cylinders of the engine.

The signal appearing across the capacitor 54 is used as the voltage source for driving the tachometer and is approximately represented by curve (1) of Fig. 5 in which the voltage between points 62 and 56 is plotted against time. At $T_0$ the breaker points 58 are closed and there is essentially a short circuit to ground with zero voltage being developed across the capacitor 54. As the breaker points quickly open at $T_1$ the voltage oscillates due to the shock excitation of capacitor 54 and coil 52. At $T_2$ the oscillations have diminished, and the voltage has reached an almost steady level of approximately 20 volts. At $T_3$ the spark across the terminals of plug 45 breaks which causes a second period of oscillation. The secondary oscillation has a lower frequency than the primary oscillation, since it is reflected from the secondary winding (higher inductance) into the primary winding. When this oscillation ceases at $T_4$, a steady voltage of approximately 14 volts supplied by the battery 46 appears across points 62 and 56. At $T_5$ the breaker points 58 close again and the cycle is completed. Obviously, the complete cycle designated by the line X—X is repeated each time the breaker points open and close, and thus when the frequency of the cycles is metered, the reading will have a linear relationship to the speed of the engine.

Electronic devices have previously been proposed to measure the frequency of the pulses produced across the breaker points of an ignition system. The devices known to the art, however, are frequently susceptible to inaccuracies arising from voltage variations in the oscillatory signal. The battery used in an automobile or truck, though nominally rated at 12 volts, may produce a voltage of 12 to 16 volts, and the average voltage of the oscillatory signals will accordingly vary through a rather large range. This variation is undesirable because it adversely affects the calibration of the device. Another source of voltage variations is the breaker point gap setting. This setting controls the length of time the breaker points remain closed and therefore the amount of flux which builds up in the transformer 51 during this period. The level of the oscillatory voltage may be affected by the strength of this field, and thus variations in the gap setting can produce variations in the average voltage of the oscillatory signals. Furthermore, the circuit values of the elements used in the ignition system, such as the inductance coil and the capacitor, will vary from one vehicle to another because it is common to allow rather large tolerances. Variations within these tolerances do not affect the operation of the ignition system, but they do adversely affect the calibration of the tachometer. The present tachometer reduces the effect of these variations, and is a simple device having relatively inexpensive parts, thus lending itself to large scale production at relatively low cost.

The improved operation and results of the invention will be apparent from a consideration of the tachometer circuit 70 shown in Fig. 4. The conductor 17 is connected between ground at point 40 and the ignition system at point 62. Thus, the complete pulse designated by the line X—X of Fig. 5 (1) will be applied to the tachometer. Coupling capacitor 34 is series connected in conductor 17, and this capacitor blocks the direct current and low frequency components of the complete pulse so that only the oscillatory signals of each pulse, which are designated Y—Y and Z—Z in Fig. 5 (1), will appear across the points 35 and 40. Capacitor 34 has a relatively high impedance at the breaker frequencies so that the operation of the ignition system is not impaired when the tachometer is coupled across the breaker points.

A zener diode 19 is connected between points 36 and 39, and a capacitor 18 is connected across points 37 and 38 in parallel with diode 19. A diode may be polarized to conduct current on the negative swings of the signals. In such a case, the negative swings of the signal are clipped off. The resulting voltage may be represented by the solid curve of Fig. 5 (2). A variation in the voltage level, which is illustrated by the dotted curve of Fig. 5 (2), and which may arise from variations in the battery voltage as previously explained, will substantially change the average voltage level. It is apparent, however, that the greatest part of the change in the average voltage is represented by the increased area under the portion of the dotted curve which lies above the line I.B.V. Thus, if the oscillatory signal is limited at the level of the line I.B.V., the average voltage will be substantially unaffected by variations in the peak voltages.

The diode 19 is a silicon diode of the zener type, and has an inverse breakdown voltage, or zener voltage, which is lower than the peak voltages of the oscillatory signals appearing across the points 36 and 39. The zener diode 19 may be polarized to conduct on the negative swings and also during the portions of the positive swings where the inverse breakdown voltage is exceeded. The resistor 31 is series connected in conductor 17 and acts as a limiting resistor for the diode 19. Resistor 31 has a relatively high resistance value compared to the internal resistance of diode 19 when it is conducting. Thus, during the periods when the diode is conducting, the resistor 31 acts to maintain the voltage across the diode at a relatively constant level. The combined effect of the diode 19 and the limiting resistor 31 on the oscillating signals is illustrated in the curve of Fig. 5 (3) where the negative swings have been clipped off and the positive swings have been limited. The average voltage of such a signal is not significantly affected by variations in the voltage of the driving signals.

As previously explained, the signals of Fig. 5 (3) are repeated each time the breaker points 58 open and close, and these repeating signals are applied to a meter damping network which includes the capacitor 18 connected across points 35 and 38, and the resistors 32 and 33 connected in conductor 17 on opposite sides of the capacitor. When the diode 19 is not conducting, the capacitor stores up electrical energy. This energy is slowly discharged from the capacitor whenever the signal voltage drops below the voltage level of the capacitor, and this discharge produces a current flow through resistor 33. The capacitor 18 has a relatively large capacity so that its voltage level does not diminish substantially between pulses. Thus, a relatively uniform voltage, which is the average of the instantaneous signal voltages, is maintained by the capacitor. The current which flows through resistor 33 is measured by ammeter 12, and the variable resistor 32 may be adjusted to control the amount of this current and thereby calibrate the meter. The average voltage level of the capacitor 18 increases or decreases in response to an increase or decrease in the pulse frequency as it varies with the engine speed, and the resulting increase or decrease in the current flowing through the ammeter 12 varies its reading accordingly to give an accurate indication of engine speeds.

The following circuit values may be used in practicing the invention, but these values should not be understood to limit the scope of the invention in any way.

| | |
|---|---|
| Capacitor 34 | 10,000 micromicrofarads. |
| Capacitor 18 | 2,500 microfarads. |
| Resistor 31 | 470 ohms. |
| Resistor 32 | 1,000 ohms. |
| Resistor 33 | 56 ohms. |
| Diode 19 | Silicon diode with zener voltage of 10.3 volts. |
| Meter 12 | 1 milliamp. range with 40 ohm internal resistance. |

It is apparent from the foregoing description that the tachometer of the invention involves a small number of elements and can be manufactured at a relatively low cost. This low cost is possible even though the invention is capable of giving a relatively accurate indication of engine speeds which satisfies the requirements of mass-produced automobiles and trucks. A variation in the battery voltage or the breaker point gap settings will not materially affect the engine speed indications, and other variations arising from differences in the electrical elements used in the ignition systems of different vehicles will likewise have little influence on the readings. Furthermore, the operation of the ignition system of the vehicle will not be adversely affected because the amount of electrical energy drawn from the system is limited by the high impedance input circuit of the tachometer.

We claim:

1. A tachometer adapted to be connected to the spark ignition system of an internal combustion engine, said ignition system including capacitor means and inductor means which are shock excited to produce electrical pulses including signals of damped oscillating voltage, with the pulses having a frequency bearing a substantially linear relationship to the speed of the engine, said tachometer including in combination conductor means for making electrical connections to the ignition system between said capacitor means and said inductor means, first capacitive reactance means connected to said conductor means for selectively passing the oscillatory components and rejecting the remainder of the pulses, said reactance means having a relatively low capacity compared to that of the capacitor means of the ignition system for minimizing the effect of the tachometer on the operation of the ignition system, zener diode means connected to a point of reference potential and having a relatively fixed inverse breakdown voltage of a lower level than most of the peak voltages of the signals, said diode means being arranged to conduct current in response to the signals when the instantaneous voltage thereof is of one polarity, and also to conduct current when the instantaneous voltage thereof is of opposite polarity and at a level exceeding the inverse breakdown voltage of said diode means, first resistance means series connected between said diode means and said first reactance means for limiting the current flow through said diode means, second capacitive reactance means connected in parallel with said diode means for producing an average current in response to the voltage output of said diode with the average current bearing a substantially linear relationship to the frequency of the pulses, second resistance means series connected between said diode means and said second capacitive reactance means for limiting the charging current of said second capacitive resistance means, metering means connected in parallel with said second capacitive reactance means and being responsive to the average current produced thereby for measuring the frequency of the pulses and indicating the speed of the engine, and variable resistance means series connected between said second capacitive reactance means and said metering means for limiting the current flow through said metering means and for providing an adjustment for calibrating said metering means.

2. A tachometer adapted to be connected to the spark ignition system of an internal combustion engine, said igition system including capacitor means and inductor means which are shock excited to produce electrical pulses including signals of damped oscillating voltages, with the pulses having a frequency bearing a substantially linear relationship to the speed of the engine, said tachometer including in combination, conductor means for making electrical connections to the ignition system, capacitor means connected to said conductor means for selectively conducting the oscillatory components of the pulses and for providing a relatively high impedance input circuit for limiting the effect of the tachometer on the ignition system, zener diode means connected to a point of reference potential and having a fixed inverse breakdown voltage of a lower level than nearly all of the peak voltages of the signals, said diode means having a forward conduction characteristic to clip oscillating voltage swings of one polarity, and having an inverse conduction characteristic to limit oscillatory voltage swings of opposite polarity, resistance means connected in series between said zener diode and said capacitor means for limiting current flow through the same, a capacitor connected to said diode means for producing a current in response to the output of said diode with the current bearing a substantially linear relationship to the frequency of the pulses, and metering means connected to said capacitor and responsive to the current produced thereby for measuring the frequency of the pulses and indicating the speed of the engine.

3. An electronic tachometer for use in an automotive vehicle having an engine with an ignition system including inductance and capacitance elements which are repeatedly shock excited to produce a series of direct current pulses having superimposed damped oscillatory components and a pulse repetition rate proportional to the speed of the engine, said tachometer including in combination, an input terminal for connection to the ignition system between the inductance and capacitance elements thereof, a series circuit connected between said input terminal and a point of reference potential, said series circuit including a first capacitor at the input thereof for blocking the direct current component of the pulses from the ignition system and for passing the oscillatory components thereof, said first capacitor having a substantially lower capacitance value than that of the capacitance element of the ignition system for providing a high input impedance for said tachometer to minimize the drain of energy from the ignition system, a zener diode connected to the point of reference potential, said zener diode having a forward conduction characteristic to rectify the oscillatory components passed by said first capacitor and an inverse conduction characteristic to limit the amplitude of said oscillatory components at a level below nearly all of the peaks thereof, thereby minimizing the effect of variations in the voltage of the ignition system, and a resistor connected between said capacitor and said zener diode for limiting the conduction of said diode, said resistor having a substantially higher resistance value than that of said zener diode for providing a relatively constant voltage across said diode during conduction thereby, and a measuring circuit connected to said series circuit, said measuring circuit including resistance means and a second capacitor connected in series across said zener diode, said second capacitor having a high capacitance value compared to that of said first capacitor for storing the energy of the signal developed across said diode and providing a relatively smooth output current at a level proportional to the speed of the engine, and metering means including an ammeter connected across said second capacitor for indicating the speed of the engine in response to the output current from said second capacitor.

References Cited in the file of this patent

UNITED STATES PATENTS

| 2,108,014 | Jones | Feb. 8, 1938 |
| 2,751,553 | McEntee | June 19, 1956 |
| 2,819,442 | Goodrich | Jan. 7, 1958 |
| 2,839,725 | Haas | June 17, 1958 |

FOREIGN PATENTS

| 1,084,265 | France | Jan. 18, 1955 |